United States Patent
Wang et al.

(10) Patent No.: US 11,522,784 B2
(45) Date of Patent: Dec. 6, 2022

(54) ROUTING AND FORWARDING METHOD FOR MULTI-HOMED NETWORK BASED ON PROGRAMMABLE NETWORK TECHNOLOGY

(71) Applicants: INSTITUTE OF ACOUSTICS, CHINESE ACADEMY OF SCIENCES, Beijing (CN); BEIJING HILI TECHNOLOGY CO., LTD, Beijing (CN)

(72) Inventors: Jinlin Wang, Beijing (CN); Jiali You, Beijing (CN); Pufang Ma, Beijing (CN); Lingfang Wang, Beijing (CN); Xiaozhou Ye, Beijing (CN); Gang Cheng, Beijing (CN)

(73) Assignees: INSTITUTE OF ACOUSTICS, CHINESE ACADEMY OF SCIENCES, Beijing (CN); BEIJING HILI TECHNOLOGY CO., LTD., Beijing (CN)

( * ) Notice: Subject to any disclaimer, the term of this patent is extended or adjusted under 35 U.S.C. 154(b) by 79 days.

(21) Appl. No.: 16/760,737

(22) PCT Filed: Dec. 21, 2017

(86) PCT No.: PCT/CN2017/117700
§ 371 (c)(1),
(2) Date: Apr. 30, 2020

(87) PCT Pub. No.: WO2019/104788
PCT Pub. Date: Jun. 6, 2019

(65) Prior Publication Data
US 2020/0358692 A1    Nov. 12, 2020

(30) Foreign Application Priority Data

Nov. 28, 2017 (CN) .......................... 201711213654.2

(51) Int. Cl.
*G06F 15/16* (2006.01)
*H04L 45/02* (2022.01)
(Continued)

(52) U.S. Cl.
CPC .............. *H04L 45/04* (2013.01); *H04L 45/20* (2013.01); *H04L 45/38* (2013.01); *H04L 45/42* (2013.01); *H04L 45/54* (2013.01)

(58) Field of Classification Search
CPC ......... H04L 45/04; H04L 45/20; H04L 45/38; H04L 45/42; H04L 45/54
(Continued)

(56) References Cited

U.S. PATENT DOCUMENTS 7,164,653 B1 * 1/2007 Bezoza ............... H04L 12/5601
370/468
7,284,068 B1 10/2007 Ramalho
(Continued)

FOREIGN PATENT DOCUMENTS

| CN | 102158497 A | 8/2011 |
|----|-------------|--------|
| CN | 103118083 A | 5/2013 |

(Continued)

OTHER PUBLICATIONS

A Way to Quickly Converge to The Destination for Multi-Address Packet in Information-Centric Networking Pufang Ma;Jinlin Wang;Jiali You 2019 IEEE 9th International Conference on Electronics Information and Emergency Communication (ICEIEC) (Year: 2019).*
(Continued)

*Primary Examiner* — Oscar A Louie
*Assistant Examiner* — Oluwatosin M Gidado
(74) *Attorney, Agent, or Firm* — Oliff PLC

(57) ABSTRACT

A programmable network technology-based multi-homed network routing and forwarding method includes a data packet performing address-to-port matching a forwarding
(Continued)

flow table address matching method; classifying addresses to matched ports corresponding to a destination address group; selecting a link information table and a port selection function, an appropriate port and a corresponding destination address group; cropping destination address groups of the remaining ports using an address filtering function and previous hop information carried in data to further crop the remaining destination address groups and addresses in the destination address group, a single destination address can be determined using a single address selection method, taking the single destination address using a universal routing and forwarding method to forward a packet to the destination address; otherwise, packaging the destination address group, and using a single address selection method to determine the single destination address hop by hop until the destination address is reached.

9 Claims, 1 Drawing Sheet

(51) Int. Cl.
   *H04L 45/00* (2022.01)
   *H04L 45/42* (2022.01)
(58) Field of Classification Search
   USPC .................................................. 709/238, 227
   See application file for complete search history.

(56) References Cited

U.S. PATENT DOCUMENTS

| | | | |
|---|---|---|---|
| 8,260,922 B1 | 9/2012 | Aggarwal et al. | |
| 2008/0320116 A1* | 12/2008 | Briggs | H04L 61/2528 709/221 |
| 2011/0235641 A1* | 9/2011 | Wada | H04L 61/2007 370/392 |
| 2012/0099592 A1* | 4/2012 | Ludwig | H04L 12/1485 370/392 |
| 2014/0258536 A1* | 9/2014 | Chiong | H04L 47/125 709/226 |
| 2016/0173338 A1* | 6/2016 | Wolting | H04L 67/1097 709/223 |
| 2017/0346788 A1* | 11/2017 | Jokela | H04L 45/74 |
| 2018/0241671 A1* | 8/2018 | Bosch | H04L 67/327 |

FOREIGN PATENT DOCUMENTS

| | | |
|---|---|---|
| CN | 103220255 A | 7/2013 |
| CN | 104079489 A | 10/2014 |
| CN | 104243317 A | 12/2014 |
| CN | 105337857 A | 2/2016 |
| CN | 104184664 B | 7/2017 |
| EP | 3 125 472 A1 | 2/2017 |
| WO | WO-2008069455 A1 * 6/2008 ......... H04L 63/1441 |
| WO | WO-2009125158 A2 * 10/2009 ......... H04L 61/2015 |

OTHER PUBLICATIONS

A Novel Mechanism to Select Better Multi-homed MIPv6 Networks Zina Jerjees;H. Al-Raweshidy 2008 The Second International Conference on Next Generation Mobile Applications, Services, and Technologies Year: 2008 | Conference Paper | Publisher: IEEE (Year: 2008).*

Software-defined home networking devices for multi-home visual sharing Jinyong Jo;Soyeon Lee;Jong Won Kim IEEE Transactions on Consumer Electronics Year: 2014 | vol. 60, Issue: 3 | Journal Article | Publisher: IEEE (Year: 2014).*

Aug. 1, 2018 Search Report issued in International Patent Application No. PCT/CN2017/117700.

* cited by examiner

ROUTING AND FORWARDING METHOD FOR MULTI-HOMED NETWORK BASED ON PROGRAMMABLE NETWORK TECHNOLOGY

RELATED APPLICATION

This application claims priority of Chinese patent application No. 201711213654.2 filed on Nov. 28, 2017, entitled "Routing and Forwarding Method for Multi-homed network based on Programmable Network Technology", which is hereby incorporated by reference.

FIELD OF THE INVENTION

The present invention relates to computer network technology, in particular to a routing and forwarding method for a multi-homed network based on programmable network technology.

BACKGROUND OF THE INVENTION

At present, a user's terminal is usually in multiple homed networks, such as Wi-Fi and 4G networks. The user may use multiple homed networks for parallel transmission to improve the transmission efficiency, and may also select a network in a good status according to changes of the homed networks to improve the transmission reliability. However, the 4G solution at present is to select one of the homed networks for communication, and thus cannot enjoy the advantages of reliability, double transmission, and selection of a better homed network according to the network status in the case of multiple homed networks. Therefore, it is necessary to implement a multi-homed function in the face of next-generation 5G networks.

Multi-homed implementations mainly include two types at present. One is address and identifier separated methods, such as LISP, HIP, LIN6 and SHIM6. These solutions may hopefully solve mobility and multi-homed problems, but at the cost of modifying the terminal or deploying a new network entity (mapping system or dedicated edge device). The other is a transport layer solution, such as SCTP and MPTCP. Such methods support concurrent multi-path transmission, but their support for the mobility is not good. Existing solutions are mainly end-to-end multi-homed transmission solutions, which allow users to use multiple homed networks simultaneously, thus improving the service quality. However, in the end-to-end multi-homed solution, network information known to an end system is limited, and multi-homed path switching cannot be implemented very well in a timely manner according to the status of the network.

SUMMARY OF THE INVENTION

An object of the present invention is to solve the problem that a multi-homed network cannot be adjusted timely according to the status of the network in traditional multi-homed technology, and in view of the fact that a programmable network device can achieve protocol independent forwarding, with an advantage of improving the flexibility of operations on data packages, a multi-homed network technical solution of multiple destination addresses based on a programmable network device is provided, in which the multiple destination addresses allow the network to select a link with the best link status for transmission according to statuses of multiple paths leading to the destination address, so as to balance traffic in the network and solve the problems of network congestion and the like. The user communication quality may be effectively improved by using the multi-homed network routing and forwarding method capable of dynamic adjustment based on the network status.

To solve the aforementioned problems, the present invention proposes a routing and forwarding method for a multi-homed network based on programmable network technology, the multi-homed network including a controller and a programmable network device, wherein the controller is configured to maintain information in the programmable network device according to the status of the network, and the programmable network device is configured to maintain two tables: a forwarding flow table and a link information table, and modify and forward a data packet, the method including:

when routing and forwarding a data packet, performing address-to-port matching according to a forwarding flow table address matching method, and classifying addresses according to matched ports, so that each port corresponds to a destination address group;

selecting, on the basis of information in the link information table and a port selection function, an appropriate port and a corresponding destination address group, and cropping destination address groups corresponding to the remaining ports;

further cropping the remaining destination address groups by using an address filtering function and previous hop information carried in data; and for remaining addresses in the destination address group, if a single destination address can be determined by adopting a single address selection method, using the single destination address as a destination address, and forwarding a message to the destination address by using a universal routing and forwarding method; otherwise, packaging the destination address group, forwarding the data package according to the port corresponding thereto, and determining a single destination address hop by hop by using a single address selection method until reaching a destination address.

As an improvement of the foregoing method, the programmable network device is a network device with custom message processing and protocol oblivious forwarding capabilities under an SDN architecture; the programmable network device implements processing and control of custom messages by the forwarding flow table at a forwarding layer through extension of the Openflow protocol; and the programmable network device is a router or switch supporting P4, POF or PIF technology.

As an improvement of the foregoing method, the forwarding flow table is a flow table for message forwarding, and records forwarded information of data messages to a destination; the controller obtains the forwarding flow table through a routing protocol and sends the same to the programmable network device; the link information table records each forwarding port $port_k$ in the programmable network device and status information values $status_{k,1}$, $status_{k,2}$ . . . of corresponding related links, the status information values including the link status of the next hop or hops and the link status of possible links, the link status including the port load, link bandwidth and latency of the next hop or hops.

As an improvement of the foregoing method, the controller is a network policy management and control center that manages routing and forwarding policies of the network, which are obtained through extension by the SDN controller; the controller includes a forwarding flow table control module and a link information table control module;

the forwarding flow table control module is configured to send commands for creating, modifying and deleting entries of the forwarding flow table to the programmable network device according to routing rules; and the link information table control module is configured to send commands for creating, modifying and deleting entries of the link information table to the programmable network device after acquiring, calculating and learning network status information.

As an improvement of the foregoing method, the single address selection method is: if only one address is present or only one address meets a destination address matching condition, selecting the address selected as the destination address; and if multiple addresses currently meet the destination address matching condition, selecting one address meeting the destination address matching condition therefrom as the destination address according to a selection policy.

As an improvement of the foregoing method, the method specifically includes:

step 1) carrying, by each data packet, multiple addresses of a user and first k hop information routed to the current address, wherein if the user has n homed networks, a set of the corresponding multiple addresses is $\{addr_1, addr_2, \ldots, addr_n\}$;

step 2) when routing and forwarding a data packets, performing address-to-port matching according to a forwarding flow table address matching method, and classifying addresses according to matched ports, so that each port corresponds to a destination address group;

step 3) querying information of all the ports in the link information table, selecting a port in a good status as a forwarding port for the next hop by using a port selection function, and cropping destination address groups corresponding to the unselected ports;

step 4) further cropping the remaining destination address groups by using an address filtering function and previous hop information carried in data; if a single destination address is obtained, preceding to step 6); otherwise, preceding to step 5), wherein the single destination address means that only one address is present or only one address meets a destination address matching condition;

step 5) if multiple addresses meet the destination address matching condition, selecting one address meeting the destination address matching condition therefrom as the single destination address according to a selection policy, and preceding to step 6); otherwise, packaging the address groups and forwarding the data package according to the corresponding ports, and preceding to step 3); and step 6) using the obtained single destination address as the destination address, and forwarding a message by using a universal routing and forwarding method until reaching the destination.

As an improvement of the foregoing method, step 2) specifically includes:

step 201) performing forwarding flow table matching on a data packet containing multiple addresses in such a manner that each address matches a corresponding forwarding port according to a forwarding flow table address matching method; wherein for a data packet with n addresses $\{addr_1, addr_2, \ldots, addr_n\}$ and a programmable network device with m ports $\{port_1, port_2, \ldots, port_m\}$, each address in the matching satisfies a mapping relationship Mapping $(addr_i)=port_j$, where $1 \leq i \leq n$, $1 \leq j \leq m$, and $port_m$ is a default port; in this way, each address matches a port according to the forwarding flow table; and step 202) classifying the addresses according to the matched ports so that the addresses corresponding to each port are classified into an address group to satisfy a mapping relationship $\{port_1:[addr_{11}, addr_{12}, \ldots ], port_2:[addr_{21}, addr_{22}, \ldots ], \ldots, port_m:[addr_{m1}, addr_{m2}, \ldots ]\}$.

As an improvement of the foregoing method, the forwarding flow table address matching method is: matching the corresponding forwarding ports according to the addresses or identifiers of the data packet, wherein different routing mechanisms adopt different matching methods, including: IP address matching and name matching in an ICN.

As an improvement of the foregoing method, the port selection function of the link information table in step 3) is $port_x=F(Z, pack)=F_2(F_1)(Z, Pack))$, where Z is a mapping relationship between the ports of the link information table and the link information table $Z=\{port_1:[status_{1,1}, status_{1,2} \ldots ], port_2: [status_{2,1}, status_{2,2} \ldots ] \ldots, port_m: [status_{m,1}, status_{m,2} \ldots ]\}$, Pack is a message content, and $F(x)$ is a port selection function based on status information; and the port selection function $F(x)$ includes a status calculation function $F_1(x)$ and a selection function $F_2(x)$; the status calculation function $F_1(x)$ uses a value of an item in the link information table or performs calculation according to values of multiple items therein to calculate a status value for each candidate port; and the selection function $F_2(x)$ selects a next hop port according to the calculated status value, and selects a port with the highest status value as a next hop forwarding port.

As an improvement of the foregoing method, the address filtering function in step 4) is used to filter an address group $ADDR_i$ corresponding to a port $port_i$ selected by the port selection function, an implementation process of which is: according to address filter information of first k hops, if no address is deleted within the k hops, address information in u $ADDR_i$ is deleted with a probability p, which ensure that in the process, at least one address is present in the $ADDR_i$.

As an improvement of the foregoing method, the destination address matching condition is: calculating an address matching scoring function under the current routing mechanism as $G(x)$, where x is an address, and $G(x)$ is scores obtained by different matching methods defined by different routing mechanisms, and represents the degree of matching a destination address; and when $G(x)>w$, where w is preset or dynamically set threshold value, it indicates that the address x meets the destination address matching condition.

As an improvement of the foregoing method, the selection policy in step 5) is: a random selection, a selection based on link prediction information or a subnet load selection.

The present invention has advantages as follows:

The system and method of the present invention can timely adjust the transmission path of the data packet according to the dynamic changes of the network, so that the user can fully enjoy the advantages of reliability, double transmission, and selection of a better homed network according to the network status in the case of multiple homed networks.

DETAILED DESCRIPTION OF THE EMBODIMENTS

Now, the present invention is further described with reference to the accompanying drawings by using multiple destination IP addresses based on POF (Protocol-Oblivious Forwarding) as an example.

The present invention proposes a routing and forwarding method for a multi-homed network based on a programmable network device. In this method, each data packet on a transmitting end carries multiple IP addresses and first k hop information routed to the current address. In maintenance information of the programmable network device, two information tables are maintained: a forwarding flow table obtained based on an IP routing and forwarding mechanism, and a link information table, wherein the link information table provides each forwarding port in the programmable network device and status information of corresponding related links. In routing and forwarding a data packet, address-to-port matching is performed first according to a forwarding flow table IP address matching method, and the addresses are classified according to matched ports, so that each port corresponds to a destination address group. On the basis of information in the status table and a port selection function, an appropriate port and a corresponding destination address group are selected, and the destination address groups corresponding to the remaining ports are cropped. The remaining destination address groups are further trimmed by using an IP address filtering function and previous hop information carried in data. Whether an IP access network address matching condition is met is determined according to addresses in the address group. If the condition is not met, the address group is packaged and the data packet is forwarded according to the corresponding port. If the condition is met, an address is selected as the destination address according to a single address selection method, other addresses are deleted, and the data packet is packaged and forwarded according to the corresponding port. In the foregoing process, judgment and execution are needed in each hop forwarding until the destination is reached.

The programmable network device refers to a network device with custom message processing and protocol oblivious forwarding capabilities under an SDN (Software Defined Network) architecture. Processing and control of custom messages by the flow table is implemented at a forwarding layer through extension of the Openflow protocol The programmable network device includes, but is not limited to, routers and switches supporting such technologies as P4, POF and PIF. Each programmable network device may support multiple addresses. The programmable network is a network composed of programmable network devices connected to each other.

Figure 1:
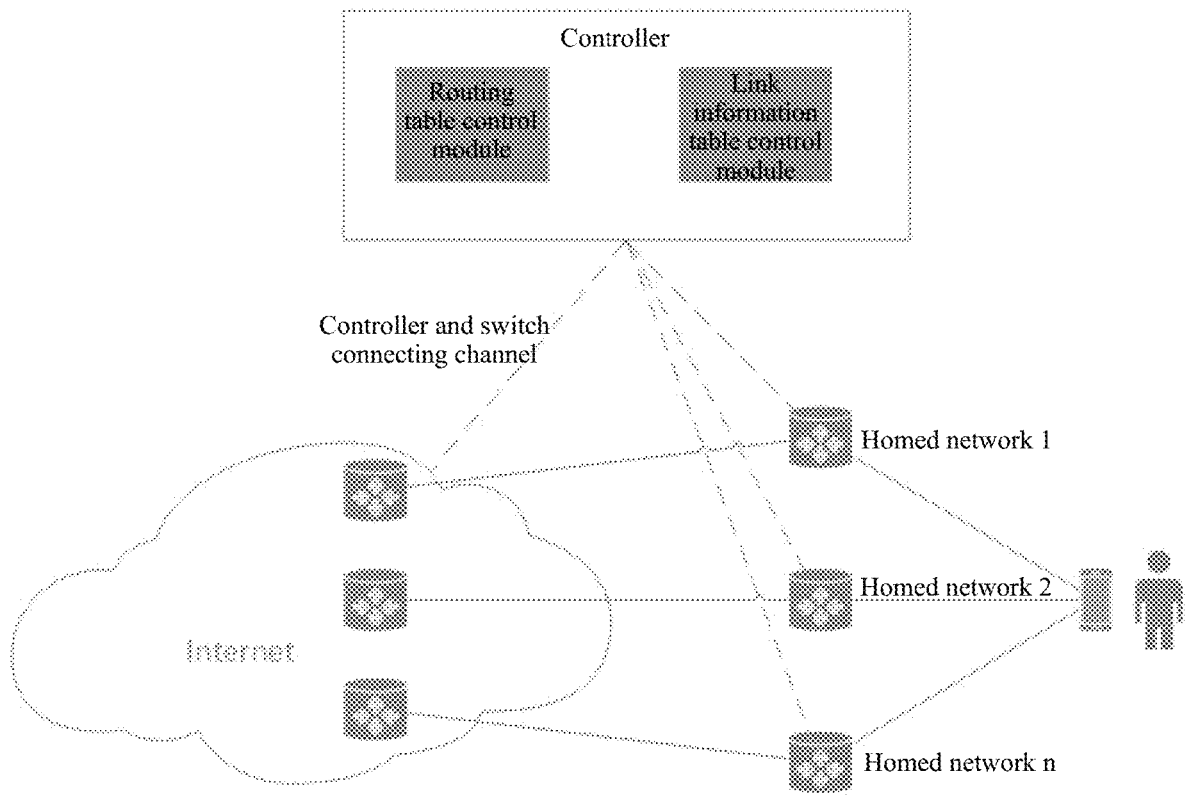
FIG. 1 is a structural diagram of a multi-homed network with multiple destination addresses based on programmable network technology in the present invention.

As shown in FIG. 1, the multi-homed network means that terminal are connected to a network through multiple access networks, wherein each terminal may transmit data through multiple networks and may receive data from multiple networks at the same time, and when the terminal is used as a receiving end, it may receive from different access networks data sent by a same terminal. The network can dynamically select a better access network for providing a service to the terminal, according to its own status. The multi-homed network is based on an SDN architecture and is mainly composed of a controller and a programmable network device. The controller mainly maintains information in the programmable network device according to the status of the network, and the programmable network device is mainly responsible for the modification and forwarding of data packets.

The forwarding flow table IP address matching method refers to matching the corresponding forwarding ports according to the IP addresses in the data packet, and the IP address matching method may be used for matching.

The forwarding flow table refers to a flow table for use in packet forwarding. The flow table is a table for forwarding data packets in the SDN, and maintains forwarded information of data messages to a destination. The controller obtains the forwarding flow table through a routing protocol and sends the same to the programmable network device. The link information table maintains link status information, which includes a port load, current link status, such as bandwidth, latency and quantities related to the network status.

The controller is a network policy management and control center that manages routing and forwarding policies of the network, which are obtained through extension by the SDN controller. The controller sends control commands to the programmable network device through a southbound interface, and the programmable network device executes the commands. The controller structurally includes a forwarding flow table control module and a link information table control module. The forwarding flow table control module mainly runs some routing algorithms based on the obtained network status to generate routing rules, and send commands for creating, modifying and deleting entries of the forwarding flow table to the programmable network device through a southbound interface. The link information table control module send commands for creating, modifying and deleting entries of the link information table to the programmable network device through a southbound interface after acquiring, calculating and learning network status information; for example, it obtains and predicts statuses of links in the network according to dynamic changes of the network and learning the previous status of the network, thereby maintaining the link information table in the programmable network device.

As to the information in the link information table, the controller sends an information maintenance strategy to the programmable network device, and the programmable network device obtains and maintains relevant information through statistical information, network measurement, and learning of dynamic network changes. The link information table reflects dynamic changes of the links in the network. $port_k$ correspond to status information $status_{k,1}$, $status_{k,2}$ . . . , values of which include, but are not limited to, the link status of the next hop or hops and the link status of possible links, such as the port load, link bandwidth, latency or other network related information of the next hop or hops, which may be obtained by measurement, prediction or the like.

Figure 2:
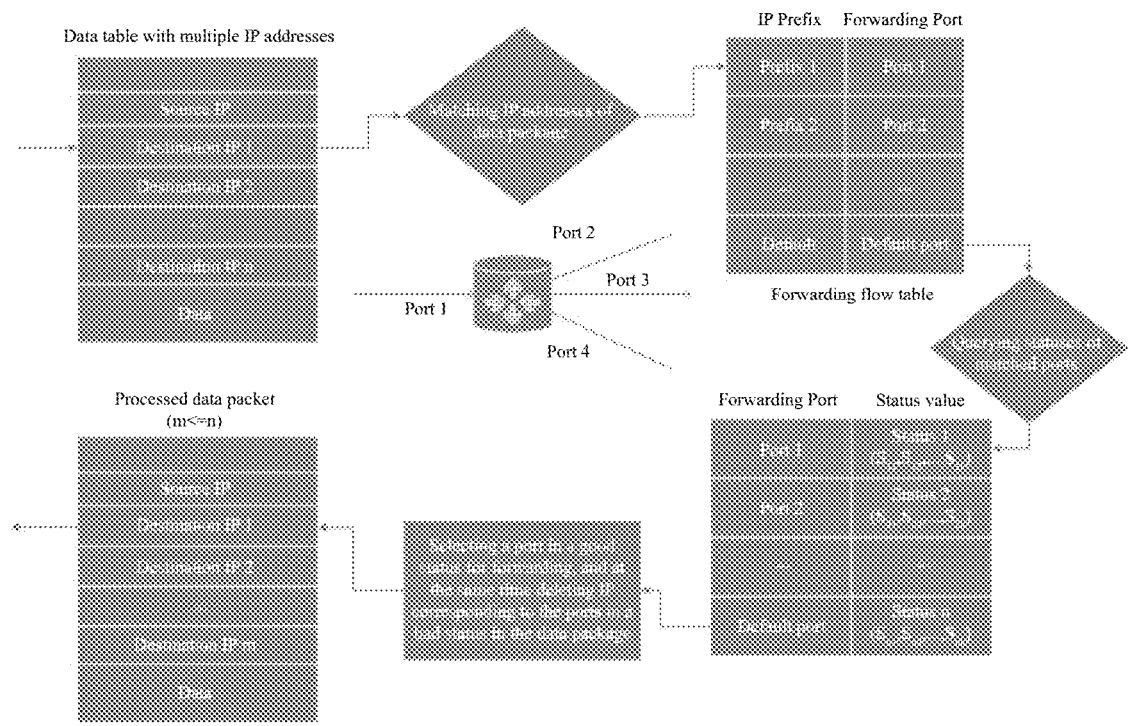
FIG. 2 is a structural diagram of a switch in the multi-homed network based on programmable network technology and a flow diagram of processing a data package with multiple destination addresses in the present invention.

As shown in FIG. 2, the routing and forwarding method specifically includes the following steps:

Step 1) carrying, by each data packet, multiple addresses of a user, which are allocated by homed networks where the user is located. Assuming that the user has n homed networks, a set of the corresponding multiple addresses is $\{IP_1, IP_2, \ldots, IPn\}$.

Step 2) performing forwarding flow table matching on a data packet containing multiple addresses in such a manner that each address matches a corresponding forwarding port according to a forwarding flow table address matching method; wherein for a data packet with n addresses $\{IP_1,$ $IP_2, \ldots, IP_n\}$ and a programmable network device with m ports $\{port_1, port_2, \ldots, port_m\}$, each address in the matching satisfies a mapping relationship Mapping$(IP_i)$=$port_j$, where $1 \leq i \leq n$, $1 \leq j \leq m$, and $port_m$ is a default port. In this way, each address matches a port according to the forwarding flow table.

Step 3) classifying the addresses according to the matched ports so that the addresses corresponding to each port are classified into an address group to satisfy a mapping relationship $\{port_1:[IP_{11}, IP_{12}, \ldots], port_2: [IP_{21}, IP_{22}, \ldots], \ldots, port_m [IP_{m1}, IP_{m2}, \ldots]\}$.

Step 4) querying information of all the ports in the link information table, selecting a port in a good status as a forwarding port for the next hop by using a port selection function, and deleting the address groups corresponding to the unselected ports; at the same time, in consideration of previous k hop address filtering information in the routing process, carrying out further destination address filtering on the destination address group corresponding to the selected forwarding port by using an address filtering function, and cropping destination address groups corresponding to the unselected ports;

wherein the port selection function based on the link information table is $port_x$=$F(Z, pack)$=$F_2(F_1(Z, Pack))$, where Z is a mapping relationship between the ports of the link information table and the link information table $Z=\{port_1:[status_{1,1}, status_{1,2} \ldots ], port_2: [status_{2,1}, status_{2,2} \ldots ] \ldots, port_m: [status_{m,1}, status_{m,2} \ldots ]\}$, Pack is a message content, and $F(x)$ is a port selection function based on status information; A status value calculation function is $F_1(x)$, and a value is a historical load of the corresponding port here, and the function outputs status values calculated according to the defined function. An appropriate forwarding port portx for next hop forwarding is selected through $F_2(x)$.

The port selection function $F(x)$ includes two steps of status calculation of $F_1(x)$ and selection of $F_2(x)$. A status value calculation function is $y=F_1(x)=load(x)$, which represents a historical load of the corresponding port x. In the selection step of $F_2(y)$, the next hop port is selected based on the status value y calculated in $F_1$. The calculation method of $F_2$ here is sorting the ports according to the status values of $F_1(x)$ from high to low, and selecting the port with the highest status value as the next hop forwarding port.

The address filtering function includes steps of: judging an address group $ADDR_i$ corresponding to a port $port_i$ selected by the port selection function, an implementation process of which is: according to IP address filter information of first k hops, if no IP address is deleted within the k hops, IP address information in u $ADDR_i$ is deleted with a probability p, which ensure that in the process, at least one IP address is present in the $ADDR_i$.

Step 5) for remaining addresses in the destination address group, if a single destination address can be determined by adopting a single address selection method, using the single destination address as a destination address, and forwarding a message to the destination address by using a universal routing and forwarding method; otherwise, packaging the destination address group, forwarding the data package according to the port corresponding thereto, and determining a single destination address hop by hop by using a single address selection method until reaching a destination address.

The single address selection method includes a step of: if only one IP address is present or only one address meets a destination address matching condition, selecting the address selected as the destination address; and if multiple addresses currently meet the destination address matching condition, selecting one address meeting the destination address matching condition therefrom as the destination address according to a selection policy. The selection strategy is: a random selection, or a selection based on link prediction information or a subnet load selection.

The destination address matching condition means that: an address matching scoring function under the current routing mechanism is defined as $G(x)$, where x is an IP address, and $G(x)$ is an IP address matching length; and when $G(x)>L$, where L is a preset matching length threshold, it indicates that the address x meets the access destination address matching condition; that is, the data message has reached an edge access network.

When a single destination address cannot be determined by using the single address selection method; that is, when there are currently multiple addresses, but none of the multiple addresses meets the address matching condition, the destination address group has to be packaged, the data package is forwarded according to the port corresponding thereto, and the single address selection method is further used for the next port to find the destination address.

Finally, it should be noted that the foregoing embodiments are only used to illustrating, rather than limiting, the technical solutions of the present invention. Although the present invention is described in detail with reference to the embodiments, those of ordinary skill in the art should understand that all modifications or equivalent substitutions made to the technical solutions of the present invention without departing from the spirit and scope of the technical solutions of the present invention should be encompassed within the scope of the claims of the present invention.

The invention claimed is:

1. A routing and forwarding method for a multi-homed network based on programmable network technology, the multi-homed network including a controller and a programmable network device, wherein the controller is a network policy management and control center that is configured to maintain information in the programmable network device according to a status of a network and manage routing and forwarding policies of the network, which are obtained through extension by a Software Defined Network (SDN) controller, the programmable network device is configured to maintain two tables: a forwarding flow table and a link information table, and modify and forward a data packet, the controller includes a forwarding flow table control module configured to send commands for creating, modifying and deleting entries of the forwarding flow table to the programmable network device according to routing rules, and the controller includes a link information table control module configured to send commands for creating, modifying and deleting entries of the link information table to the programmable network device after acquiring, calculating, and learning network status information, the method comprising:

when routing and forwarding the data packet, performing address-to-port matching according to a forwarding flow table address matching method, and classifying external global addresses according to matched forwarding ports, so that each forwarding port corresponds to a destination address group;

selecting, based on information in the link information table and a port selection function, an appropriate port and a corresponding destination address group, and cropping destination address groups corresponding to the remaining ports;

further cropping the remaining destination address groups by using an address filtering function and previous hop information carried in data; and for remaining addresses in the destination address group, when a single destination address is determined by adopting a single address selection method, using the single destination address as a destination address, and forwarding a message to the destination address by using a universal routing and forwarding method, and otherwise, packaging the destination address group to form a data package, forwarding the data package according to the port corresponding thereto, and determining a single destination address hop by hop by using a single address selection method until reaching a destination address, the single address selection method is performed by (i) when only one address is present or only one address meets a destination address matching condition, selecting the address selected as the destination address, and (ii) when multiple addresses currently meet the destination address matching condition, selecting one address meeting the destination address matching condition therefrom as the destination address according to a selection policy, the single address selection method includes:

step 1) carrying, by each data packet, multiple addresses of a user and first k hop information routed to the current address, wherein when the user has n homed networks, a set of the corresponding multiple addresses is $\{addr_1, addr_2, \ldots, addr_n\}$;

step 2) when routing and forwarding each data packet, performing the address-to-port matching according to the forwarding flow table address matching method, and classifying addresses according to matched ports, so that each port corresponds to a destination address group;

step 3) querying information of all the ports in the link information table, selecting a port in a good status as a forwarding port for the next hop by using the port selection function, and cropping destination address groups corresponding to the unselected ports;

step 4) further cropping the remaining destination address groups by using the address filtering function and previous hop information carried in data, and when a single destination address is obtained, preceding to step 6), otherwise, preceding to step 5), wherein the single destination address means that only one address is present or only one address meets a destination address matching condition;

step 5) when multiple addresses meet the destination address matching condition, selecting one address meeting the destination address matching condition therefrom as the single destination address according to a selection policy, and preceding to step 6), and otherwise, packaging the address groups and forwarding the data package according to the corresponding ports, and preceding to step 3); and step 6) using the obtained single destination address as the destination address, and forwarding a message by using a universal routing and forwarding method until reaching the destination.

2. The routing and forwarding method for a multi-homed network based on programmable network technology according to claim 1, wherein the programmable network device is a network device with custom message processing and protocol oblivious forwarding (POF) capabilities under a Software Defined Network (SDN) architecture;

the programmable network device implements processing and control of custom messages by the forwarding flow table at a forwarding layer through extension of an Openflow protocol; and the programmable network device is a router or switch supporting P4, POF or PIF technology.

3. The routing and forwarding method for a multi-homed network based on programmable network technology according to claim 1, wherein the forwarding flow table is a flow table for message forwarding, and records forwarded information of data messages to a destination;

the controller obtains the forwarding flow table through a routing protocol and sends the obtained forwarding flow table to the programmable network device; and the link information table records each forwarding port $port_k$ in the programmable network device and status information values $status_{k,1}$, $status_{k,2}$ ... of corresponding related links, the status information values including a link status of a next hop or hops and a link status of possible links, each link status including a port load, link bandwidth and latency of the next hop or hops.

4. The routing and forwarding method for a multi-homed network based on programmable network technology according to claim 1, wherein step 2) includes:

step 201) performing forwarding flow table matching on a data packet containing multiple addresses in such a manner that each address matches a corresponding forwarding port according to a forwarding flow table address matching method, wherein for a data packet with n addresses $\{addr_i, addr_2, \ldots, addr_n\}$ and a programmable network device with m ports $\{port_1, port_2, \ldots, port_m\}$, each address in the matching satisfies a mapping relationship Mapping $(addr_i)=port_j$, where $1 \le i \le n$, $1 \le j \le m$, and $port_m$, is a default port, such that each address matches a port according to the forwarding flow table; and step 202) classifying the addresses according to the matched ports so that the addresses corresponding to each port are classified into an address group to satisfy a mapping relationship $\{port_1: [addr_{11}, addr_{12}, \ldots], port_2: [addr_{21}, addr_{22}, \ldots], \ldots, port_m: [addr_{m1}, addr_{m2}, \ldots]\}$.

5. The routing and forwarding method for a multi-homed network based on programmable network technology according to claim 1, wherein the forwarding flow table address matching method is: matching the corresponding forwarding ports according to the addresses or identifiers of the data packet, wherein different routing mechanisms adopt different matching methods, comprising: IP address matching and name matching in an Information-Centric Network (ICN).

6. The routing and forwarding method for a multi-homed network based on programmable network technology according to claim 1, wherein:

the port selection function of the link information table in step 3) is $port_x=F(Z, pack)=F_2(F_1(Z, Pack))$, where Z is a mapping relationship between the ports of the link information table and the link information table $Z=\{port_1: [status_{1,1}, status_{1,2} \ldots], port_2: [status_{2,1}, status_{2,2} \ldots], \ldots, port_m: [status_{m,1}, status_{m,2} \ldots]\}$, Pack is a message content, and $F(x)$ is a port selection function based on status information;

the port selection function $F(x)$ comprises a status calculation function $F_1(x)$ and a selection function $F_2(x)$;

the status calculation function $F_1(x)$ uses a value of an item in the link information table or performs calculation according to values of multiple items therein to calculate a status value for each candidate port; and the selection function $F_2(x)$ selects a next hop port according to the calculated status value, and selects a port with the highest status value as a next hop forwarding port.

7. The routing and forwarding method for a multi-homed network based on programmable network technology according to claim 6, wherein the address filtering function in step 4) is used to filter an address group $ADDR_i$ corresponding to a port $port_i$ selected by the port selection function, an implementation process of which is:

according to address filter information of first k hops, when no address is deleted within the k hops, address information in u $ADDR_i$ is deleted with a probability p, which ensure that in the process, at least one address is present in the $ADDR_i$.

8. The routing and forwarding method for a multi-homed network based on programmable network technology according to claim 1, wherein:

the destination address matching condition is: calculating an address matching scoring function under the current routing mechanism as $G(x)$, where x is an address, and $G(x)$ is scores obtained by different matching methods defined by different routing mechanisms, and represents the degree of matching a destination address; and when $G(x)>w$, where w is preset or dynamically set threshold value, $G(x)>w$ indicates that the address x meets the destination address matching condition.

9. The routing and forwarding method for a multi-homed network based on programmable network technology according to claim 1, wherein the selection policy in step 5) is: a random selection, or a selection based on link prediction information or a subnet load selection.

* * * * *